United States Patent [19]
Laas et al.

[11] Patent Number: 6,007,619
[45] Date of Patent: Dec. 28, 1999

[54] USE OF NONIONIC, WATER-DISPERSIBLE POLYISOCYANATES AS CONCRETE ADDITIVES

[75] Inventors: Hans-Josef Laas, Köln; Martin Brahm, Leverkusen; Jan Mazanek, Köln; Hermann Kober, Bergisch Gladbach; Manfred Schönfelder, Leverkusen; Dietbert Knöfel; Karl-Georg Böttger, both of Siegen; Anke Reinschmidt, Kreuztal, all of Germany

[73] Assignee: Bayer Aktiengesellschaft, Leverkusen, Germany

[21] Appl. No.: 08/988,575

[22] Filed: Dec. 11, 1997

[30] Foreign Application Priority Data

Dec. 24, 1996 [DE] Germany ............. 196 54 429

[51] Int. Cl.$^6$ .................................. C04B 24/12
[52] U.S. Cl. ............. 106/727; 106/808; 106/823; 524/2; 524/5
[58] Field of Search .............. 106/727, 808, 106/823; 524/5, 2

[56] References Cited

U.S. PATENT DOCUMENTS

| | | | |
|---|---|---|---|
| 3,965,051 | 6/1976 | Markusch et al. | 260/2.5 AK |
| 3,977,889 | 8/1976 | Shearing . | |
| 4,143,014 | 3/1979 | McLaughlin et al. | 260/29.2 TN |
| 4,153,470 | 5/1979 | Stahl et al. . | |
| 4,211,680 | 7/1980 | Shearing | 260/29.2 TN |
| 4,228,053 | 10/1980 | McLaughlin et al. . | |
| 4,630,963 | 12/1986 | Wyman | 404/75 |
| 4,663,377 | 5/1987 | Hombach et al. | 524/196 |
| 4,939,191 | 7/1990 | Kataoka et al. | 524/5 |
| 5,086,175 | 2/1992 | Minato et al. | 544/221 |
| 5,200,489 | 4/1993 | Jacobs et al. | 528/49 |
| 5,235,018 | 8/1993 | Potter et al. | 528/49 |
| 5,252,696 | 10/1993 | Laas et al. | 528/49 |
| 5,563,207 | 10/1996 | Brahm et al. | 524/591 |
| 5,725,654 | 3/1998 | Shawl et al. | 106/727 |
| 5,731,396 | 3/1998 | Laas et al. | 528/49 |

FOREIGN PATENT DOCUMENTS

| | | | |
|---|---|---|---|
| 2148783 | 11/1995 | Canada . | |
| 23579 | 2/1981 | European Pat. Off. . | |
| 0181261 | 5/1986 | European Pat. Off. | 106/727 |
| 181261 | 5/1986 | European Pat. Off. . | |
| 566037 | 10/1993 | European Pat. Off. . | |
| 50006213 | 3/1975 | Japan . | |
| 50139121 | 11/1975 | Japan . | |
| 356098259 | 8/1981 | Japan . | |
| 358122960 | 7/1983 | Japan . | |
| 08217516 | 8/1996 | Japan . | |
| 408217516 | 8/1996 | Japan . | |
| 0618358 | 6/1978 | U.S.S.R. | 106/727 |
| 001143723 | 3/1985 | U.S.S.R. | 106/727 |
| 001147703 | 3/1985 | U.S.S.R. | 106/727 |
| 1208059 | 1/1986 | U.S.S.R. . | |
| 1192864 | 5/1970 | United Kingdom . | |
| 1413121 | 11/1975 | United Kingdom . | |

OTHER PUBLICATIONS

Inorganic–Organic Polymers & Foams, Peter Markusch Mobuy Chemical Corporation pp. 1–12, 1981.
Inorganic–Organic Polymers and Foams, Peter H. Markusch et al (date unavailable).

*Primary Examiner*—Paul Marcantoni
*Attorney, Agent, or Firm*—Joseph C. Gil; Thomas W. Roy; Diderico van Eyl

[57] ABSTRACT

The present invention relates to a process for preparing mortar/concrete compositions by incorporating into the mortar/concrete compositions either before or during the mixing operation a water-dispersible polyisocyanate which a) has an average isocyanate functionality of 1.8 to 4.0, b) contains 4.0 to 25.0 wt. % of aliphatically and/or cycloaliphatically bound isocyanate groups (calculated as NCO; molecular weight=42) and c) contains 5 to 80 wt. % of ethylene oxide units present within polyether chains (calculated as $C_2H_4O$; molecular weight=44), in which d) the polyether chains contain an average of 5 to 50 ethylene oxide units.

12 Claims, No Drawings

USE OF NONIONIC, WATER-DISPERSIBLE POLYISOCYANATES AS CONCRETE ADDITIVES

BACKGROUND OF THE INVENTION

1. Field of the Invention

The present invention relates to the use of nonionically modified, water-dispersible polyisocyanates having aliphatically and/or cycloaliphatically bound isocyanate (groups as conditioners for inorganic binders in the production of high-density/high-strength mortar or concrete compositions.

2. Description of the Prior Art

Conventional concrete/mortar compositions contain an inorganic binder such as cement; an aggregate such as gravel or sand; water; and also optionally further conditioners and/or additives. The only difference in building material terms between concrete and mortar in this context is the maximum particle size of the aggregates used. When the maximum particle sizes are up to 4 mm, the mixture is generally referred to as mortar, while with coarser aggregates, the mixture is generally referred to as concrete. The terms "concrete" and "mortar" will not therefore be further differentiated in the context of the present invention, the two terms instead standing synonymously for any mineral building materials based on inorganic binders.

Plastics are today increasingly used as conditioners for improving the working and service properties of concrete, for example, to increase strength or chemical resistance. H. Schorn, Betone mit Kunststoffen, [Concretes Containing Plastics] Ernst & Sohn Verlag für Architektur und technische Wissenschaften, Berlin 1991, p. 25, for example, gives an overview of the wide variety of polymers which have already been tried out for modifying concrete.

Polyisocyanates have also already been proposed as possible concrete conditioners. Aromatic polyisocyanates, such as diphenylmethane diisocyanate (MDI), tolylene diisocyanate (TDI) or derivatives thereof, are described in DE-A 1,924,468 as suitable conditioners for cement mixtures. Biurets and urethanes of the aliphatic hexamethylene diisocyanate (HDI) have also been disclosed for this purpose. When these polyisocyanates, either alone or combined with other isocyanate-reactive polymers, are admixed with a concrete composition in the manufacture of floor coverings, accelerated complete hardening is said to result such that the floor coverings may be walked on sooner. EP-A 23,579 also discloses the effect of more rapid full hardening of concrete/mortar compositions following the addition of small quantities of organic, preferably aromatic, polyisocyanates.

In both of these references exclusively hydrophobic polyisocyanates are used which are completely incompatible with water and cannot be stirred homogeneously into an inorganic binder even when considerable quantities of organic solvents are co-used. However, as uniform as possible a distribution of the polyisocyanate component in the binder mixture is a fundamental prerequisite for forming a uniform polymer skeleton within the inorganic binder matrix and, thus, for achieving optimum final properties in the concrete.

EP-A 181,261 describes the use of finely divided aqueous dispersions of polyisocyanates for the endogenous carbonatization of concrete. The only polyisocyanate used in this case is hydrophobic MDI which, premixed with water in an weight ratio of from 4:1 to 2:1, i.e., in the form of a water-in-oil emulsion, is added to the concrete composition using a high-speed stirrer. Although the water-in-MDI emulsions obtained with the use of high shear forces show a limited stability in isolation, it can be demonstrated that when the latter emulsions are stirred into an excess quantity of an aqueous system, such as a concrete mixture, phase separation takes place instantaneously, and no finely divided oil-in-water emulsions are obtained. According to the process of EP-A 181,261, it is also not possible to incorporate polyisocyanates in concrete or mortar compositions in a sufficiently homogeneous manner.

According to the teachings of DE-A 2,300,206, the compatibility of hydrophobic polyisocyanates with cement compositions can be improved markedly by combining them with water-soluble polymers, for example cellulose derivatives, polyvinyl alcohols or polyether alcohols, which optionally also contain additional emulsifiers. However, the resulting aqueous cement mixtures remain workable only for impracticably short periods of a few minutes, even when organic solvents are co-used. In addition, the considerable quantities of water-soluble polymers which are introduced into the binder provide permanent hydrophilic properties, which result in concrete having undesirably high water absorption.

U.S. Pat. No. 4,143,014 describes a highly specific process for incorporating a hydrophobic polyisocyanate in an aqueous system. According to this process, mixtures of water-soluble polyether diols with an excess, based on equivalents, of MDI can, within a short period following the onset of the urethanization reaction but still before its termination, be stirred in to form clear, stable solutions in water. Such solutions, according to U.S. Pat. No. 4,228,053, are said also to be suitable for improving the strength and resistance properties of concrete. The precise point in time from which the reaction mixtures prepared from MDI and polyether alcohol show sufficient water-miscibility for a few minutes is dependent on the type of polyether, diol utilized and can be determined only by laborious preliminary experimentation. Therefore, this process cannot be used in commercial operations.

All of the preceding processes for modifying concrete by the addition of polyisocyanates either require the use of additional organic compounds, for example, solvents or special water-soluble polymers, which raise ecological concerns, or they require special mixing units such as high-speed stirrers in order to render the hydrophobic polyisocyanate component mixable with the inorganic binder even to a minor degree.

Attempts have already been made to avoid these disadvantages by utilizing self-dispersible polyisocyanates, which have been hydrophilically modified by the incorporation of ionic groups (DE-A 2,359,611), as conditioners for inorganic binders. Such polyisocyanates containing salt groups can be stirred in very finely divided manner into aqueous systems without the need for high shear forces, but their stability in storage is completely inadequate. Even at room temperature, the known catalytic activity of ionic groups gives rise to the polymerization of the isocyanate groups, for example, by trimerization into polyisocyanurates or with the formation of α-nylon structures, which results in gelation of the product, generally within a few days.

An object of the present invention is now to provide novel isocyanate-functional conditioners to improve the working and service properties of concrete, which do not have the disadvantages of the prior art conditioners. These novel conditioners should be stable in storage and free of organic solvents, should be readily stirrable into aqueous systems without the need for special mixing units, and should provide dispersions having the smallest possible particle size and greatest stability.

The isocyanate/water reaction should proceed as slowly as possible in these dispersions to ensure that the time in which the concrete compositions remain workable is adequate.

This object may be achieved with by using water-dispersible polyisocyanates, which are known, as conditioners for inorganic binders. The invention, which is described in greater detail hereinafter, is based on the surprising observation that the addition to conventional concrete or mortar compositions of even only very small quantities of water-dispersible polyisocyanate blends, which have been rendered hydrophilic with nonionic groups, can bring about a considerable improvement in the mechanical properties, such as compressive, tensile strength and elasticity. It is particularly surprisingly that despite the fact that $CO_2$ arises within the concrete composition during the isocyanate-water reaction and unavoidable endogenous carbonatization consequently takes place, no negative effects on the strength and resistance properties are discernible.

SUMMARY OF THE INVENTION

The present invention relates to a process for preparing mortar/concrete compositions by incorporating into the mortar/concrete compositions either before or during the mixing operation a water-dispersible polyisocyanate which
 a) has an average isocyanate functionality of 1.8 to 4.0,
 b) contains 4.0 to 25.0 wt. % of aliphatically and/or cycloaliphatically bound isocyanate groups (calculated as NCO; molecular weight=42) and
 c) contains 5 to 80 wt. % of ethylene oxide units present within polyether chains (calculated as $C_2H_4O$; molecular weight=44), in which
 d) the polyether chains contain an average of 5 to 50 ethylene oxide units.

DETAILED DESCRIPTION OF THE INVENTION

The concrete conditioners utilized according to the invention are known water-dispersible polyisocyanates which have aliphatically and/or cycloaliphatically bound isocyanate groups and are rendered hydrophilic with polyether alcohols containing nonionic groups.

The starting compounds for preparing the water-dispersible polyisocyanates are selected from diisocyanates having a molecular weight of 140 to 400 and containing aliphatically and/or cycloaliphatically bound isocyanate groups and which may be prepared by phosgenation or by a phosgene free process, for example by decomposition of the corresponding urethanes. Examples include 1,4-butane diisocyanate, 1,6-hexamethylene diisocyanate (HDI), 1,5-diisocyanato-2,2-dimethyl-pentane, 2,2,4- or 2,4,4-trimethyl-1,6-diisocyanatohexane, 1,10-diisocyanatodecane, 1,3- and 1,4-diisocyanatocyclohexane, 1-isocyanato-3,3,5-trimethyl-5-isocyanatomethyl-cyclohexane (isophorone diisocyanate, IPDI), 4,4'-diisocyanatodicyclohexyl-methane, 1,3-diisocyanato-2(4)-methylcyclohexane and mixtures thereof. Also suitable are polyisocyanates prepared by modifying, the preceding diisocyanates to incorporate uretdione, isocyanurate, urethane, allophanate, biuret, iminooxadiazinedione and/or oxadiazine trione groups, which are described, e.g., in DE-A 1,670,666, DE-A 3,700,209 and DE-A 3,900,053 or in EP-A 336,205 and EP-A 339,396.

Preferred starting, compounds are HDI, IPDI, 4,4'-diisocyanato-dicyclohexylmethane, mixtures thereof and polyisocyanates derivatives prepared from these diisocyanates.

Hydrophilic polyether alcohols which are suitable for preparing the water-dispersible polyisocyanates are monohydric or polyhydric polyalkylene oxide polyether alcohols containing an average of 5 to 50 ethylene oxide units per molecule, which are prepared in known manner by the alkoxylation of suitable starter molecules. Suitable starter molecules include monohydric or polyhydric alcohols having a molecular weight of 32 to 300. Examples include methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclo-hexanols, hydroxymethyl cyclohexane, 3-methyl-3-hydroxymethyloxetane, 1,2-ethanediol, 1,2- and 1,3-propanediol, the isomeric butanediols, pentanediols, hexanediols, heptanediols and octanediols, 1,2- and 1,4-cyclohexanediol, 1,4-cyclohexane dimethanol, 4,4'-(1-methylethylidene)-bis cyclohexanol, 1,2,3-propanetriol, 1,1,1-trimethylol ethane, 1,2,6-hexanetriol, 1,1,1-trimethylol propane, 2,2-bis(hydroxymethyl)-1,3-propanediol and 1,3,5-tris(2-hydroxyethyl) isocyanurate.

Ethylene oxide and propylene oxide are preferred alkylene oxides for the alkoxylation reaction and may be utilized in the alkoxylation reaction in any order or as a mixture. Examples of polyether alcohols are either pure polyethylene oxide polyether alcohols or polyalkylene oxide polyethers in which the alkylene oxide units contain at least 70 mole %, preferably at least 80 mole %, of ethylene oxide units.

Preferred polyalkylene oxide polyether alcohols are those prepared with mono-alcohols having a molecular weight of 32 to 150 as starter molecules. More preferred are pure polyethylene glycol monomethyl ether alcohols containing an average of 5 to 50, most preferably 5 to 25 ethylene oxide units.

The preparation of the water-dispersible polyisocyanates utilized according to the invention as concrete conditioners is known and may take place in accordance with the processes described in EP-A 206,059, EP-A 540,985 or U.S. Pat. No. 5,200,489 (herein incorporated by reference) by reacting polyisocyanates having aliphatically and/or cycloaliphatically bound isocyanate groups with the previously described hydrophilic monofunctional polyether alcohols.

The non-aqueous polyisocyanate compositions described in EP-A 486,881, which can be prepared by reacting monofunctional polyether alcohols with simple diisocyanates, followed by mixing the resulting polyether urethanes with aliphatic and/or cycloaliphatic polyisocyanates, are also suitable as concrete conditioners.

Water-dispersible polyisocyanates containing allophanate groups and optionally isocyanurate groups and/or uretdione groups are also suitable. These polyisocyanates may be obtained, for example, according to EP-A 524,500, EP-A 566,037, EP-A 682,012 or U.S. Pat. No. 5,086,175 (herein incorporated by reference) by reacting monomeric aliphatic and/or cycloaliphatic diisocyanates with polyether alcohols at an NCO/OH equivalent ratio of 5:1 to 50:1, in the presence of a compound which accelerates the formation of allophanate groups and optionally the trimerization and/or dimerization of isocyanate groups, followed by the separation of the unreacted diisocyanate monomer until the residual content is less than 0.5 wt. %.

The water-dispersible polyisocyanates which are described in U.S. Pat. No. 5,373,050 (herein incorporated by reference) or JP 95/113,0.05, which in addition to hydrophilic polyethylene oxide polyethers also contain hydrophobic components, such as fatty alcohols or hydroxy-functional fatty acid esters, may also be utilized according to the invention as concrete conditioners.

In addition to the water-dispersible polyisocyanates which have been mentioned and exclusively contain aliphatically and/or cyclo-aliphatically bound isocyanate groups, water-dispersible polyisocyanates which also have aromatically bound isocyanate groups, preferably in deficient amount, based on the total quantity of free isocyanate groups, may also be used, provided that these aromatic polyisocyanates meet the conditions specified under a) to d). Such mixed aliphatic/aromatic polyisocyanates are also known and may be prepared, for example, according to EP-A 680,983, by reacting polyethylene oxide polyethers with mixtures of HDI-based polyisocyanates and polyisocyanates based on 2,4(6)-diisocyanatotoluene (tolylene diisocyanate, TDI).

Regardless of the process selected for their preparation, water-dispersible polyisocyanates which have an average isocyanate functionality of 1.8 to 4.0, preferably 1.8 to 3.5, and contain 4.0 to 25.0 wt. % of aliphatically and/or cycloaliphatically bound isocyanate groups and 5 to 80 wt. % of ethylene oxide units bound within polyether chains, wherein the polyether chains contain an average of 5 to 50, preferably 5 to 25, ethylene oxide units, are used as conditioners for inorganic binders in the production of mortar compositions or concrete. More preferably, the polyisocyanates contain 6.0 to 21.5 wt. % of aliphatically bound isocyanate groups and 5 to 75 wt. % of ethylene oxide units bound within polyether chains or they contain 4.0 to 13.0 wt. % of cycloaliphatically bound isocyanate groups and 10 to 70 wt. % of ethylene oxide units bound within polyether chains.

Particularly preferred concrete conditioners are either water-dispersible polyisocyanates which are prepared by reacting an HDI-based polyisocyanate substantially containing isocyanurate groups and optionally uretdione groups and/or allophanate groups and having an isocyanate content of 19 to 24 wt. % and a free HDI monomer content of less than 0.5 wt. % with a polyethylene glycol monomethyl ether having an average of 5 to 25 ethylene oxide units, or water-dispersible polyisocyanates which are prepared by reacting HDI or 4,4'-diisocyanatodicyclohexylmethane with these polyethers at an NCO/OH equivalent ratio of 6:1 to 50:1, in the presence of a compound which accelerates the formation of allophanate groups and optionally the trimerization and/or dimerization of isocyanate groups, followed by separation of the unreacted diisocyanate monomer until the residual content is less than 0.5 wt. %.

According to the invention, the water-dispersible polyisocyanates are added to any concrete or mortar compositions to improve the working and service properties. It is known to produce concrete from inorganic binders, aggregates, water and optionally further conditioners and additives, e.g., see Ullmanns Encyclopädie der technischen Chemie, 4th edition, Vol. 8, Verlag Chemie, Weinheim, pp 314–326.

The term "inorganic binders" conventionally describes mineral substances which, after absorbing water, harden fully like stone as a result of physical and/or chemical processes. Examples include Portland cement, Portland metallurgical cement, Portland fly ash cement, Portland limestone cement, Portland fly ash metallurgical cement, blast furnace cement, special cements (such as cements having high sulphate resistance, a low heat of hydration or a low alkali content), synthetic anhydrite, gypsum or quicklime.

In particular natural or synthetic, dense or porous stones, such as sand, gravel, crushed stone, chippings, crushed rock fine aggregate, foamed lava, crushed clinker, granite, basalt, pumice, clay, clay shale, shale, fly ash or vermiculite, and in individual cases also metals or organic aggregates, may be used as aggregates.

Further conditioners and additives which can be added to affect the properties of fresh or hardened concrete in a desired manner may optionally be used in concrete production. The term "concrete conditioners" means substances which are added to the concrete in amounts of 5 wt. % or less and, thus, are inconsequential in volume terms. Examples include concrete fluidifiers, air-entraining agents, concrete waterproofing agents, set retardants or accelerators and injection aids used for prestressed concrete.

The "concrete additives" are added to the concrete in much larger quantities than the conditioners. Examples of these "concrete additives" include, in particular mineral substances, such as rock flour, fly ash, blast furnace slag or trass, and also include plastics or pigments/cement colorants.

In accordance with the present invention the water-dispersible polyisocyanates are added to a mortar or concrete composition in an amount up to 10 wt. %, preferably 0.5 to 5 wt. %, based on the weight of the binder. They may be added at any point before or during the mixing operation, either as such or in the form of aqueous dispersions of the polyisocyanates in all or a portion of the mixing water.

The water-dispersible polyisocyanates are generally utilized in solvent-free form. However, they may optionally, although less preferably, be added in the form of solutions in suitable solvents which are inert to isocyanate groups. Examples of suitable solvents include ethyl acetate, butyl acetate, ethylene glycol monomethyl ether acetate or ethylene glycol monoethyl ether acetate, 1-methoxypropyl-2-acetate, 2-butanone, 4-methyl-2-pentanone, cyclohexanone, toluene, and mixtures thereof. Also suitable are propylene glycol diacetate, diethylene glycol dimethyl ether, diethylene glycol ethyl ether acetate, diethylene glycol butyl ether acetate, N-methyl pyrrolidone N-methyl caprolactam, and mixtures of these and/or the preceding solvents.

Due to their excellent emulsifiability, the water-dispersible polyisocyanates can also be stirred into concrete or mortar compositions in very finely divided and completely homogeneous manner without special mixing units such as high-speed stirrers. Even the addition of only small quantities results in a considerable improvement in the working and service properties of the binder mixture. As a result of a marked fluidity-improving effect on the fresh mortar formulation, the water/cement ratio (w/c) is markedly lower in mortars modified according to the invention than in comparable unmodified samples. The fully hardened polyisocyanate-modified mortars have a higher density because less mixing water is required. This is manifested, inter alia, in considerably improved mechanical properties, for example, increased compressive and tensile bending strength, improved freeze-thaw cycling resistance and resistance to chemical attack.

In aqueous systems the water-dispersible polyisocyanates utilized according to the invention as conditioners form stable, finely divided emulsions or solutions in which the reaction of the isocyanate groups with the water proceeds very slowly.

Therefore, the period during which the concrete or mortar compositions remain workable is not limited by the use of the polyisocyanates according to the invention.

The concrete or mortar compositions produced with the addition of water-dispersible polyisocyanate mixtures having aliphatically and/or cycloaliphatically bound isocyanate groups may be used in all of those areas of construction engineering in which conventional building materials are currently used. They are in particular suitable for applications demanding high mechanical strength and, chemical resistance, for example, in construction and civil engineering, for floor coverings, in road construction or for impervious industrial surfaces.

The following examples serve to explain the invention further. All percentages are by weight, unless otherwise indicated

EXAMPLES

Preparation of the starting compounds
Water-dispersible polyisocyanate mixture Z1)

25 parts by weight of a monofunctional polyethylene oxide polyether initiated with methanol and having a number average molecular weight of 350 were added at room temperature, with stirring, to 75 parts by weight of an HDI-based polyisocyanate containing isocyanurate groups and having an NCO content of 21.5%, an average NCO functionality of approx. 3.8, a viscosity at 23° C. of 3000 mPa·s and a free monomer content of 0.1% HDI monomer, followed by heating to 100° C. for 3hours. After cooling to room temperature, a virtually colorless, clear polyisocyanate was obtained which had the following properties:

NCO content: 13.1%
HDI monomer: 0.07%
Viscosity (23° C.): 3400 mPa·s
Ethylene oxide unit content (calculated): 22.7%
NCO functionality (calculated): approx. 3.1

Water-dispersible polyisocyanate Z2)

A freshly prepared catalyst solution of 0.2 parts by weight tin(II) octoate in 0.6 parts by weight of a monofunctional polyethylene oxide polyether having a number average molecular weight of 350 and initiated with methanol were added at room temperature, with stirring, to 70 parts by weight HDI, followed by heating to 85 to 90° C. At this temperature a further 29.4 parts by weight of the same polyether were then added dropwise. The temperature of the mixture increased to 110° C. due to the onset of the exothermic reaction. When the addition was complete, stirring was continued at 90 to 95° C. for approx. 30 min. until an NCO content of 27.0% was reached. The reaction was terminated by the addition of 0.1 parts by weight dibutyl phosphate, and the unreacted HDI monomer was separated in a thin-film evaporator at a temperature of 130° C. and 0.1 mbar pressure. A virtually colorless, clear allophanate group-containing polyisocyanate was obtained which had the following properties:

NCO content: 10.4%
HDI monomer: 0.2%
Viscosity (23° C.): 240 mPa·s
Ethylene oxide unit content (calculated): 47.2%
NCO functionality (calculated): 2.0

Water-dispersible polyisocyanate Z3)

A freshly prepared catalyst solution of 0.1 parts by weight of zinc acetyl acetonate in 0.3 parts by weight of a monofunctional polyethylene oxide polyether having a number average molecular weight of 350 and initiated with methanol was added at room temperature, with stirring, to 80 parts by weight of 4,4'-diisocyanatodicyclohexylmethane, followed by heating to 90 to 95° C. A further 19.7 parts by weight of the polyether were then added dropwise. The temperature of the mixture increased to approximately 105° C. due to the onset of the exothermic reaction. When the addition was complete, stirring was continued at 100° C. for 2 to 3 hours until an NCO content of 20.8% was reached. The reaction was terminated by the addition of 0.1 parts by weight isophthaloyl chloride, and the unreacted diisocyanate monomer was separated in a thin-film evaporator at a temperature of 170° C. and 0.1 mbar pressure. A light yellow, clear allophanate group-containing polyisocyanate was obtained which had the following properties:

NCO content: 7.6%
4,4'-diisocyanatodicyclohexylmethane monomer: 0.3%
Viscosity (23° C.): 8200 mPa.s
Ethylene oxide unit content (calculated): 41.5%
NCO functionality (calculated): 2.0

Water-dispersible polyisocyanate Z4)

3 parts by weight of n-butanol were added at a temperature of 50° C. to a mixture prepared from 52 parts by weight of an HDI-based polyisocyanate containing uretdione groups and isocyanurate groups, having an NCO content of 21.8%, an average NCO functionality of approx. 2.5, a viscosity of 170 mPa.s at 23° C. and a monomer content of 0.2% of HDI monomer, and 23 parts by weight of 2,4-diisocyanatotoluene (TDI), followed by stirring until the NCO content had fallen to 26.1%. The product was left to cool to 40° C., 0.075 parts by weight of a trimerization catalyst (Mannich base based on phenol/dimethylamine, 40% in butyl acetate) were added, and the mixture was maintained at this temperature for a further 72 hours until the NCO content was 18.5%. The trimerization was terminated by the addition of 0.05 parts by weight of p-toluene sulphonic acid methyl ester. 22 parts by weight of a monofunctional polyethylene oxide polyether started with methanol and having a number average molecular weight of 550 were added to the resulting polyisocyanate, with stirring, at 50° C. until an NCO content of 12.7% was reached. After cooling to room temperature, a virtually colorless, clear polyisocyanate was obtained having the following properties:

NCO content: 12.7%
Aliphatically bound NCO content (calculated): 7.1% min.
Aromatically bound NCO content (calculated): 5.6% max.
Viscosity (23° C.): 8000 mPa.s
TDI monomer: 0.08%
HDI monomer: <0.03%
Ethylene oxide unit content (calculated): 20.7%
NCO functionality (calculated): approx. 2.3

Preparation of polyisocyanate emulsions 100 parts by weight of water were added in each case to 10 parts by weight of polyisocyanates Z1) to Z4) in a beaker with manual stirring for 2 min. In the case of polyisocyanates Z1) and Z4), very finely divided, blue-tinged emulsions were formed, and in the case of polyisocyanates Z2) and Z3), virtually clear solutions were formed. After standing for 180 min at 23° C., all the emulsions and solutions were still stable; in no case was any precipitation, bottom sediment or $CO_2$ generation observed.

For comparative purposes, in accordance with Example 1 of EP-A 181 261, 5 parts by weight of water were added in a stirred beaker to 20 parts by weight of a liquid distilled diphenylmethane diisocyanate (MDI) containing 65% of 2,4'- and 35% of 4,4'-MDI, having an NCO content of 32.0% and a viscosity of 30 mPa.s at 23° C. The mixture was premixed at 2000 rpm using a high-speed stirrer, forming a milky-brown emulsion. 97.5 parts by weight of water were then added to one half (12.5 parts by weight) of the latter water-in-oil emulsion in a second beaker with manual stirring for 2 minutes as previously described. A homogeneous emulsion was not obtained. Instead phase separation took place immediately after the addition of the water. After standing for 15 min, the MDI-water mixtures showed pronounced foaming in both beakers due to $CO_2$ generation.

Examples 1–4

Production of polyisocyanate-modified mortar compositions

In accordance with DIN EN 196 Part 1, fresh and hardened mortar samples were prepared from conventional commercial Portland cement (DIN 1164—CEM I 42.5 R) as the binder and CEN standard sand (DIN EN 196) as the aggregate. For this purpose the binder and the mixing water were charged into the mixing trough and premixed at a low stirring speed for 30 sec (level 1). The aggregate was then added within 30 sec at the same stirring speed, followed by mixing at a high stirring speed (level 2) for a further 30 sec. After setting for 90 sec, the mortar was stirred on level 2 for a further 60 sec. The water-dispersible polyisocyanates Z1) to Z4) utilized as conditioners were in each case added to the mixing water in a quantity of 2%, based on the binder content of the mixture, and were dispersed using a bar mixer at 12,000 rpm for 20 sec. By varying the quantity of water added, the mortars were adjusted uniformly to a slump of 170±5 mm.

The water/cement ratio (w/c), air content and apparent density of each of the resulting fresh mortar compositions were determined. The values are set forth in Table 1. For comparison purposes an unmodified mortar was prepared in an analogous manner.

TABLE 1

W/c ratio, air content and apparent density of fresh mortar

| Example | Conditioner | W/c | Air content [vol. %] | Apparent density of fresh mortar [kg/dm$^3$] |
|---------|-------------|------|----------------------|-----------------------------------------------|
| Comparison | — | 0.47 | 5.3 | 2.25 |
| 1 | Z1) | 0.35 | 5.8 | 2.24 |
| 2 | Z2) | 0.41 | 7.1 | 2.21 |
| 3 | Z3) | 0.33 | 5.2 | 2.33 |
| 4 | Z4) | 0.36 | 7.5 | 2.25 |

A comparison of the w/c ratios shows the fluidity-improving effect of the water-dispersible polyisocyanates on the fresh mortar formulations.

The tensile bending strength and compressive strength and the dynamic modulus of elasticity (E modulus) of the polyisocyanate-modified mortars after hydration for 7 and 28 days were determined to characterize the properties of the hardened mortar. Prisms 40×40×160 mm according to DIN EN 196, Part 1 were prepared as test specimens. Depending on the type of polyisocyanate added, the test specimens were demolded after hardening, 1 to 3 days after production. The standard prisms were then stored under water at 20° C. until the 7th day following production, after which they were stored in a controlled climate at 23° C./50% relative atmospheric humidity (DIN 50014) until the end of the test.

Table 2 demonstrates the hardened mortar properties of the modified mortars in comparison with the corresponding unmodified sample. All the mortars prepared according to the invention (Examples 1 to 4) possessed strengths which were markedly higher than those of the unmodified sample. Some of the values determined were considerably higher than those of the comparative sample.

TABLE 2

Bending tensile strength and compressive strength and dynamic E modulus after 7 and 28 days' hydration

| Example | Conditioner | Releasable after [d] | Bending tensile strength [N/mm$^2$][a] | | Compressive strength [N/mm$^2$][a] | | Dynamic E modulus [N/mm$^2$][a] | |
|---------|-------------|---------------------|------|------|------|------|------|------|
| | | | 7 d | 28 d | 7 d | 28 d | 7 d | 28 d |
| Comparison | — | 1 | 7.60 (100%) | 9.55 (100%) | 48.6 (100%) | 61.5 (100%) | 40150 (100%) | ++37700 (100%) |
| 1 | Z1) | 3 | 10.44 (137%) | 13.33 (140%) | 80.6 (166%) | 101.6 (165%) | 50050 (125%) | 52050 (138%) |
| 2 | Z2) | 3 | 9.68 (127%) | 10.39 (109%) | 61.8 (125%) | 85.3 (139%) | 43100 (107%) | 45150 (120%) |
| 3 | Z3) | 1 | 10.64 (140%) | 14.55 (152%) | 78.4 (161%) | 98.3 (160%) | 50950 (127%) | 49950 (132%) |
| 4 | Z4) | 1 | 7.75 (102%) | 9.93 (104%) | 61.7 (127%) | 81.8 (133%) | 49350 (123%) | 49000 (130%) |

[a]Percentages refer in all cases to the values of the comparison mortar

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for preparing a mortar/concrete composition by mixing an inorganic binder, an aggregate, water, the improvement which involves incorporating into the mortar/concrete composition either before or during the mixing operation a hydrophilic, strength-enhancing water-dispersible polyisocyanate in solvent-free form which a) has an average isocyanate functionality of 1.8 to 4.0, b) contains from 4.0 to 25.0 wt. % of an isocyanate component comprising a group selected from the group consisting of aliphatically-bound isocyanate groups and cycloaliphatically bound isocyanate groups, calculated as NCO; molecular weight=42, and c) contains 5 to 80 wt. % of ethylene oxide units present within polyether chains, calculated as $C_2H_4O$; molecular weight=44, in which d) the polyether chains contain an average of 5 to 50 ethylene oxide units wherein the water-dispersible polyisocyanate can be used in an amount up to 10 wt. % based on the weight of the binder.

2. The process of claim 1 wherein the water-dispersible polyisocyanate a) has an average isocyanate functionality of 1.8 to 3.5, b) contains 6.0 to 21.5 wt. % of aliphatically bound isocyanate groups, calculated as NCO; molecular weight=42, and c) contains 5 to 75 wt. % of ethylene oxide units present within polyether chains, calculated as $C_2H_4O$; molecular weight=44, in which d) the polyether chains contain an average of 5 to 25 ethylene oxide units.

3. The process of claim 2 wherein the water-dispersible polyisocyanate is prepared by reacting a polyisocyanate, which is prepared from 1,6-diisocyanatohexane, has an isocyanate group content of 19 to 24 wt. % and a 1,6-diisocyanatohexane monomer content of less than 0.5 wt. % and contains isocyanurate groups, and optionally a group comprising a component selected from the group consisting of uretdione groups and allophanate groups, with a polyethylene glycol monomethyl ether which contains as an average of 5 to 25 ethylene oxide units.

4. The process of claim 2 wherein the water-dispersible polyisocyanate is prepared by reacting 1,6-diisocyanatohexane with a polyethylene glycol monomethyl ether which contains an average of 5 to 25 ethylene oxide units at an NCO/OH equivalent ratio of 6:1 to 50:1 in the presence of a compound which accelerates the formation of allophanate groups, and optionally a group comprising a component selected from the group consisting of isocyanurate groups and uretdione groups, and separating unreacted 1,6-diisocyanatohexane monomer until the residual monomer content is less than 0.5 wt. %.

5. The process of claim 1 wherein the water-dispersible polyisocyanate a) has an average isocyanate functionality of 1.8 to 3.5, b) contains from 4.0 to 13.0 wt. % of cycloaliphatically bound isocyanate groups, calculated as NCO; molecular weight=42, and c) contains 10 to 70 wt. % of ethylene oxide units present within polyether chains, calculated as $C_2H_4O$; molecular weight=44, in which d) the polyether chains contain as an average of 5 to 25 ethylene oxide units.

6. The process of claim 5 wherein the water-dispersible polyisocyanate is prepared by reacting 4,4'-diisocyanatodicyclohexyl-methane with a polyethylene glycol monomethyl ether which contains an average of 5 to 25 ethylene oxide units at an NCO/OH equivalent ratio of from 6:1 to 50:1 in the presence of a compound which accelerates the formation of allophanate groups and optionally a group comprising a component selected from the group consisting of isocyanurate groups and uretdione groups, and separating unreacted 4,4'-diisocyanato-dicyclohexylmethane monomer until the residual monomer content is less than 0.5 wt. %.

7. The process of claim 1 wherein the water-dispersible polyisocyanate is present in an amount of up to 10 wt. %, based on the binder content of the mortar/concrete composition.

8. The process of claim 2 wherein the water-dispersible polyisocyanate is present in an amount of up to 10 wt. %, based on the binder content of the mortar/concrete composition.

9. The process of claim 3 wherein the water-dispersible polyisocyanate is present in an amount of up to 10 wt. %, based on the binder content of the mortar/concrete composition.

10. The process of claim 4 wherein the water-dispersible polyisocyanate is present in an amount of up to 10 wt. %, based on the binder content of the mortar/concrete composition.

11. The process of claim 5 wherein the water-dispersible polyisocyanate is present in an amount of up to 10 wt. %, based on the binder content of the mortar/concrete composition.

12. The process of claim 6 wherein the water-dispersible polyisocyanate is present in an amount of up to 10 wt. %, based on the binder content of the mortar/concrete composition.

\* \* \* \* \*